(No Model.)
J. N. JENNINGS.
TIRE TIGHTENER.
No. 541,328. Patented June 18, 1895.
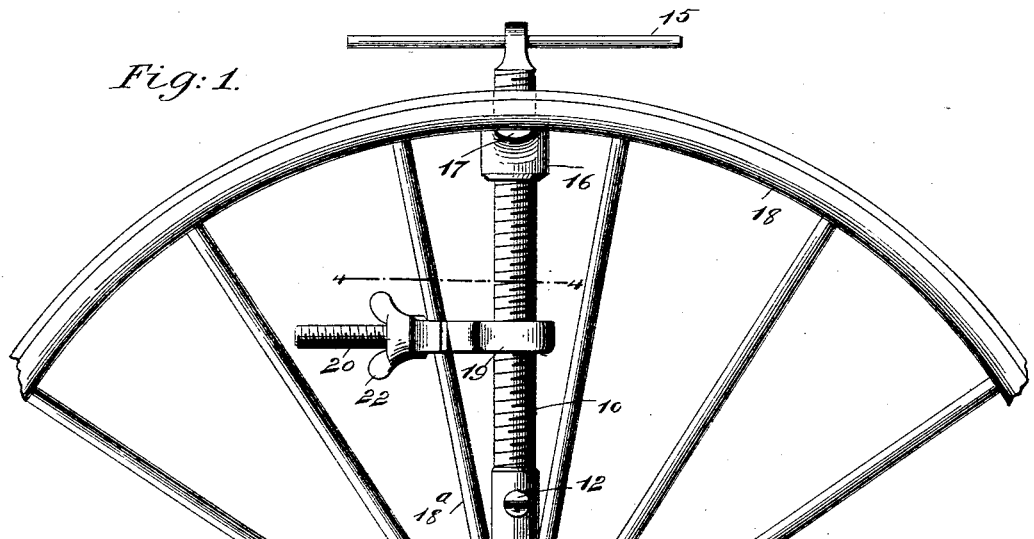
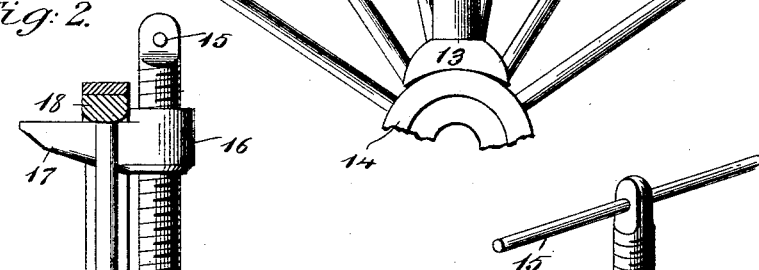
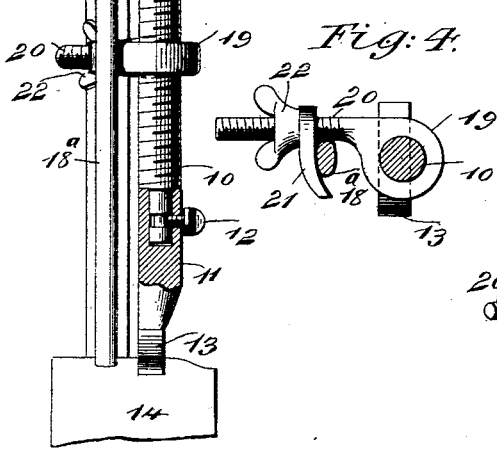
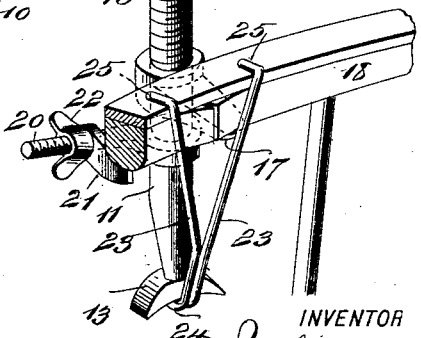
WITNESSES:
John G. Renner
W. B. Hutchinson
INVENTOR
J. N. Jennings
BY
Munn & Co.
ATTORNEYS.

UNITED STATES PATENT OFFICE.

JASPER N. JENNINGS, OF PORTLAND, OREGON, ASSIGNOR OF ONE-HALF TO ARMSTRONG GLOVER, OF SAME PLACE.

TIRE-TIGHTENER.

SPECIFICATION forming part of Letters Patent No. 541,328, dated June 18, 1895.

Application filed August 22, 1894. Serial No. 520,971. (No model.)

*To all whom it may concern:*

Be it known that I, JASPER N. JENNINGS, of Portland, in the county of Multnomah and State of Oregon, have invented a new and Improved Tire-Tightener, of which the following is a full, clear, and exact description.

My invention relates to improvements in tire tighteners; and the object of my invention is to produce an extremely cheap, simple and strong device of this kind, which may be instantly applied to any wheel and which enables a tire to be quickly tightened without removing the wheel from its axle, and which also enables the wheel to be spread so that the spokes may be removed if necessary, the fellies straightened and other analogous work easily performed on the wheel.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a front elevation of the device as applied to a wheel. Fig. 2 is a side elevation, partly in section, of the same. Fig. 3 is a detail perspective view showing the application of the device to a wheel when the broken-down ends of abutting felly-sections are to be straightened up, and Fig. 4 is a cross-section on the line 4 4 of Fig. 1.

The device is provided with a screw 10 which forms its body portion and which is detachably secured to a foot section 11 to which it is held by a set screw 12 which projects through the foot section and enters a groove in the screw, as shown in Fig. 2, and the foot section is provided at the bottom with a foot 13 which is concave on the under side so that it may rest firmly on the hub 14 of the wheel, and in order that the screw may be turned easily it has a handle 15 at its upper end. The screw is threaded to fit the end 16 of a lifting arm 17 which is adapted to project beneath the felly 18 of the wheel so as to lift it from the spoke and tighten the tire thereon. The screw carries a nut 19 having a projecting threaded arm 20 on which is a hook 21 which is adjusted by means of the thumb screw 22 which also prevents the displacement of the hook, and the hook is adapted to engage one of the spokes 18ª of the wheel so as to hold the apparatus in place while it is being used.

The apparatus is applied to the wheel by placing the foot 13 on the hub, engaging the hook with one of the spokes 18ª, placing the arm 17 beneath the felly, and then, by turning the screw by means of the handle 15 the arm 17 may be raised so as to lift the felly and tighten the tire. This may be done at necessary points around the wheel, and as fast as the tire is tightened at a certain point suitable washers may be inserted at the outer ends of the spokes, to take up the slack, this arrangement being common and needing no detailed description.

As the felly is raised its sections may be held in the correct position by placing wedges between the abutting ends of adjacent sections. If the ends of abutting felly sections have become broken down, as shown in Fig. 3, and are to be straightened up, as shown in Fig. 3, a stirrup is used, comprising the diverging members 23 which are formed of a single wire bent, at the junction of the members, into a hook 24 to support the foot 13 and at the outer ends of the members into hooks 25 to rest on the tire. The stirrup is used by hanging it on the tire opposite the joint of the felly to be straightened, and then the foot 13 is placed in the hook 24, the arm 17 beneath the joint to be straightened, and the screw 10 turned so as to force up the bent ends of the felly sections into their normal position, in which position they may be held by suitable wedges.

It will be seen that this device may be applied to any kind of wheel, as the hoop 21 may be adjusted in and out so as to fit in the proper manner around the spokes, and it will also be observed that, by means of the screw, extremely heavy pressure will be applied to the felly so that the latter may be forced outward against the tire sufficiently to thoroughly tighten the latter and the sections of the felly may be fastened in any usual way.

Having thus described my invention, I claim as new and desire to secure by Letters Patent—

1. A tire tightener, comprising a foot section to fit a wheel hub, a screw journaled to the foot section, a laterally extending lifting arm carried by the screw, a nut threaded on the screw and provided with a laterally extending arm, and a hook held adjustably on the arm, substantially as described.

2. The combination, of the screw, the foot section journaled to the screw and the lifting arm on the screw, of the nut threaded to fit the screw and provided with a loosely extending threaded arm, the hook on the arm, and the nut threaded to fit the arm and bear against the hook, substantially as described.

3. The combination, with the screw, its foot section and the lifting arm threaded to fit the screw, of the stirrup having hooks at opposite ends, substantially as described.

JASPER N. JENNINGS.

Witnesses:
R. I. ECKERSON,
IDA SHOCKLEY.